(12) United States Patent
Mollier et al.

(10) Patent No.: US 12,460,720 B2
(45) Date of Patent: Nov. 4, 2025

(54) ACTUATION DEVICE FOR A TRANSMISSION SYSTEM

(71) Applicant: VALEO EMBRAYAGES, Amiens (FR)

(72) Inventors: Christophe Mollier, Cergy Pontoise (FR); Herve Maurel, Cergy Pontoise (FR); Fabien Diascorn, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/640,226

(22) Filed: Apr. 19, 2024

(65) Prior Publication Data
US 2024/0353003 A1    Oct. 24, 2024

(30) Foreign Application Priority Data

Apr. 19, 2023    (FR) ........................................ 2303933

(51) Int. Cl.
     *F16H 63/30*      (2006.01)

(52) U.S. Cl.
     CPC ... *F16H 63/304* (2013.01); *F16H 2063/3056* (2013.01)

(58) Field of Classification Search
     CPC .................. F16H 63/304; F16H 2063/3056
     See application file for complete search history.

(56) References Cited

U.S. PATENT DOCUMENTS

| | | | | |
|---|---|---|---|---|
| 3,368,638 | A | * | 2/1968 | Terry ................. F16H 63/3023 |
| | | | | 475/221 |
| 4,428,248 | A | * | 1/1984 | Broucksou .............. F16H 61/32 |
| | | | | 192/48.91 |
| 2005/0241422 | A1 | * | 11/2005 | Fuhrer .................. F16H 63/304 |
| | | | | 74/325 |

FOREIGN PATENT DOCUMENTS

| | | |
|---|---|---|
| DE | 10 2021 209 053 A1 | 2/2023 |
| EP | 1 520 127 A1 | 4/2005 |
| FR | 2485674 A1 * | 12/1981 |

OTHER PUBLICATIONS

Office Action issued Oct. 11, 2024, in corresponding European Patent Application No. 24 170 352.9 (with partial unedited computer-generated English translation), 10 pages.

\* cited by examiner

*Primary Examiner* — Minnah L Seoh
*Assistant Examiner* — Gregory T Prather
(74) *Attorney, Agent, or Firm* — Oblon, McClelland, Maier & Neustadt, L.L.P.

(57) ABSTRACT

Actuation device for a transmission system includes an electric motor kinematically connected to a speed reducer and an output shaft of the speed reducer of axis of rotation, the output shaft being arranged to pivot through three adjacent angular sectors, a first angular sector, a second angular sector adjacent to the first angular sector, and a third angular sector adjacent to the second angular sector. An actuation cam is rigidly connected to the output shaft for rotation therewith. A receiving part is axially movable along a main axis perpendicular to the axis of rotation, comprising a receiving recess for receiving the actuation cam formed by two surfaces parallel to each other and perpendicular to the main axis.

17 Claims, 6 Drawing Sheets

ACTUATION DEVICE FOR A TRANSMISSION SYSTEM

BACKGROUND OF THE INVENTION

Field of the Invention

The present invention relates to the field of actuation devices for transmission systems.

Description of the Related Art

The actuation device is for example inserted into a connecting clutch transmission system interposed between the output of a speed reducer and the wheel of the vehicle. Alternatively, the actuation device is for example used in addition to an actuation fork for changing a speed ratio in a gearbox. The transmission system can for example transmit torque or movement.

In the case of a speed reducer having a plurality of speed ratios, or a gearbox, the actuation device allows engagement between an axially movable sliding sleeve and at least one idler gear, generally two idler gears. The idler gear(s) is/are mounted freely about a driven shaft and the sliding sleeve is rotatably coupled to this driven shaft. The engagement of an idler gear thus makes it possible to rigidly connect this idler gear to this driven shaft for rotation therewith. The axial movement of the sliding sleeve is placed under the control of a selection fork for selecting at least one speed ratio, generally two speed ratios. Such engagement takes place when there is angular correspondence between the engaging teeth of the sliding sleeve and the engaging teeth of one of the idler gears.

Such actuation devices can be used in certain semi-automatic gearboxes, in which the selection of the speed ratios is controlled by an actuation device such as an electromechanical actuator. Such an actuation device is known from EP1520127. In this gearbox, the electromechanical actuator uses a rotatably movable actuating rod, which is provided at its end with an eccentric pin for interaction with the movable sliding sleeve. A 180° rotation of the actuating rod by means of an electric motor from the rotation position corresponding to an axial end position of the movable sliding sleeve to a rotation position corresponding to the other axial end position of the movable sliding sleeve results in the coupling or uncoupling of the jaw clutch.

One drawback of this actuation device lies in the need to perform a 180° rotation of the actuating rod to reach the two actuation end positions. The actuation time is therefore longer. Precise angular positioning of the actuating rod is also necessary to be sure of retaining the end position situated at 180°. As a result, the actuation device must comprise an accurate angular position sensor. Finally, the two actuation end positions are not stable, as an angular variation of a few degrees on the actuating rod generates a movement of the movable sliding sleeve with the risk of disengaging the speed ratio.

BRIEF SUMMARY OF THE INVENTION

The present invention aims to overcome these drawbacks by proposing an actuation device having a shorter actuation time to reach the two actuation end positions.

The main object of the present invention is thus an actuation device for a transmission system, comprising:

an electric motor kinematically connected to a speed reduction device and an output shaft of the speed reduction device of axis of rotation Y, the output shaft being arranged to pivot through three adjacent angular sectors, a first angular sector, a second angular sector adjacent to the first angular sector, and a third angular sector adjacent to the second angular sector;

an actuation cam rigidly connected to the output shaft for rotation therewith;

a receiving part axially movable along a main axis X perpendicular to the axis of rotation Y, comprising a receiving recess for receiving the actuation cam formed by two surfaces parallel to each other and perpendicular to the main axis X, the actuation device being notable in that the receiving part moves axially between two end positions when the output shaft pivots through the whole second angular sector, the receiving part remaining axially immobile in a first end position when the rotation of the output shaft is situated in the first angular sector, and the receiving part remaining axially immobile in a second end position when the rotation of the output shaft is situated in the third angular sector.

This actuation device makes it possible, in particular due to the first angular sector and the third angular sector, to have two stable actuation end positions as an angular variation of a few degrees on the output shaft does not generate any movement of the receiving part. As these two actuation end positions are stable, it is possible to switch off the power supply in the actuation device, thus reducing the electricity consumption of the vehicle.

The angle value of the second angular sector is strictly less than 180°. The angular displacement of the output shaft is thus reduced, which results in a reduction in the actuation time.

Preferably, the actuation cam can have two contact zones bearing on the parallel surfaces of the receiving recess, and the bearing width along the main axis X separating the two contact zones is constant in the three angular sectors of rotation of the output shaft. The accuracy of the actuation is thus improved.

Advantageously, an operating clearance can be defined between the bearing width of the actuation cam and the distance axially separating the two parallel surfaces of the receiving recess along the main axis X, and the operating clearance is constant in the three angular sectors of rotation of the output shaft. The operating clearance is of the order of 0.1 mm to 0.6 mm. The accuracy of the actuation is thus improved.

Preferably, the receiving part can be a part exhibiting symmetry of revolution about the main axis X, the receiving recess being an annular groove. A relative rotation about the main axis X between the receiving part and the actuation cam is possible.

Advantageously, the receiving part can comprise at least a first connecting spline arranged to rotate a driven shaft, and a second connecting spline arranged to drive a drive shaft, the first and second connecting splines being engaged when the receiving part is in a second coupled end position and one of the first and second connecting splines being disengaged when the receiving part is in a first uncoupled end position.

Preferably, the actuation cam can comprise three actuation faces made in the form of a cylinder portion, and the three centres of the cylinder portions form an isosceles triangle, the main vertex of the isosceles triangle being coincident with the axis of rotation Y of the output shaft. The geometry of the contact zones of the actuation cam uses large-diameter cylinder portions thus making it possible to reduce the contact pressure with the parallel surfaces of the receiving recess.

Advantageously, the actuation cam can have a symmetrical actuation profile the axis of symmetry of which passes through the bisector of the isosceles triangle, the bisector of the isosceles triangle corresponding to the middle of the second angular sector. The actuation cam thus has a symmetrical profile passing through the axis of rotation Y.

According to one variant, the actuation cam can comprise three actuation faces made in the form of a cylinder portion, and the three centres of the cylinder portions form an equilateral triangle, one of the vertices of the equilateral triangle being coincident with the axis of rotation Y of the output shaft.

According to another variant, the actuation cam can comprise three actuation faces made in the form of a cylinder portion, and the three centres of the cylinder portions form a rectangular isosceles triangle, the main vertex of the rectangular isosceles triangle being coincident with the axis of rotation Y of the output shaft. With this geometry in the form of a rectangular triangle, the rotation about the axis of rotation Y of the actuation cam is only 90° to reach the two end positions. More specifically, the second angular sector has an angle value of 90°.

Advantageously, at least two actuation faces of the actuation cam can be connected together by a cylindrical connecting face having a smaller radius than the radius of the cylinder portions, the connecting radius being between 1 and 5 mm.

Preferably, the actuation cam can comprise an end radius arranged to interact with the parallel surfaces of the receiving part and tangentially connecting two actuation faces, the centre of this end radius being concentric with the axis of rotation Y.

For example, the end radius can be larger than the radius of the cylindrical connecting faces. This thus prevents the peening of the contact zone of the end radius when the receiving part remains axially immobile in one of the two end positions.

According to one embodiment, the main axis X of the receiving part can intersect the axis of rotation Y.

According to another embodiment, the main axis X of the receiving part can not intersect the axis of rotation Y, the axis of rotation Y being offset relative to a plane parallel to the axis of rotation Y and passing through the main axis X by a value of between 0 mm and the height of the isosceles or equilateral triangle of the actuation cam.

According to another embodiment, the actuation cam can comprise n actuation faces produced in the form of a cylinder portion, the n cylinder portion centres forming a regular polygon having an uneven number of sides, for example a pentagon.

The actuation device according to the invention can have one or other of the features described below, in combination with each other or taken independently of each other:
- the actuation device is fitted to a fastening housing;
- the angle value of the first angular sector is strictly greater than 3°;
- the angle value of the second angular sector is between 20° and 179°;
- the angle value of the third angular sector is greater than 3°;
- the angle value of the first angular sector is identical to the angle value of the third angular sector;
- the angle value of the first angular sector is different from the angle value of the third angular sector;
- the angle value of the second angular sector is greater than the angle value of the first angular sector;
- the angle value of the second angular sector is greater than the angle value of the third angular sector;
- the actuation cam comprises a connecting orifice, the output shaft being inserted into the connecting orifice of the actuation cam;
- the output shaft is force-fitted into the connecting orifice of the actuation cam;
- the output shaft is welded to the actuation cam;
- the output shaft is connected by a spline or nesting of complementary shapes to the connecting orifice of the actuation cam.

The invention also relates, according to another of its aspects, to a transmission system comprising:
- a drive transmission shaft comprising a first external spline;
- a driven transmission shaft coaxial with the drive shaft, comprising a second external spline;
- an actuation device having all or some of the aforementioned features, wherein the receiving part is an axial sliding sleeve having a shape exhibiting symmetry of revolution, the axial sliding sleeve comprising at least a first internal connecting spline arranged to rotate the drive shaft and a second internal connecting spline arranged to rotate the driven shaft, the first and second internal splines being engaged respectively in the first external spline of the drive shaft and the second external spline of the driven shaft when the receiving part is in one of the two end positions, this end position being referred to as the second coupled end position.

This transmission system architecture is compact and suitable for any incorporation into a speed reducer of an electric vehicle to disconnect the transmission of torque originating from the drive shaft, for example the output shaft of a speed reducer, to the driven shaft, for example the wheel of a vehicle. When the reversible electric machine associated with the speed reducer is inactive, there is no benefit in leaving said machine connected to the wheel of the vehicle. In this embodiment of the invention, the transmission system is an improved connecting clutch between a drive shaft and a driven shaft.

Advantageously, the second internal connecting spline of the axial sliding sleeve can be made in the form of a series of internal splines axially spaced apart at a uniform pitch, for example five internal splines axially spaced apart at a pitch of between 3 and 15 mm.

Preferably, the second internal connecting spline can be disengaged from the second external spline of the driven shaft when the receiving part is in the other of the two end positions, this end position being referred to as the first uncoupled end position.

The invention also relates, according to another of its aspects, to a transmission system comprising:
- a driven transmission shaft;
- an idler gear rotatably movable about the driven transmission shaft of main axis X, the idler gear comprising an engaging spline;
- an engagement sleeve axially movable along the main axis X, the engagement sleeve being rotated by an internal spline engaged with an external spline of the driven transmission shaft, the internal spline of the engagement sleeve being capable of driving the engaging spline of the idler gear;

an actuation fork axially movable along a control rod of secondary axis X1 parallel to the main axis X and arranged to move the engagement sleeve;

an actuation device having all or some of the aforementioned features, wherein the receiving part is a control member rigidly connected to the actuation fork and that slides along the secondary axis X1 of the control rod, so that when the receiving part is in a first uncoupled end position, no torque is transmitted between the idler gear and the driven transmission shaft, and when the receiving part is in a second coupled end position, torque is transmitted between the idler gear and the driven transmission shaft.

This transmission system architecture is compact and suitable for any incorporation into a speed reducer of an electric vehicle to connect an idler gear to a driven shaft. When the reversible electric machine associated with the speed reducer is inactive, there is no benefit in engaging the speed ratio of the speed reducer. In this embodiment of the invention, the transmission system is an improved single-speed jaw clutch.

The invention also relates, according to yet another of its aspects, to a transmission system comprising:

a driven transmission shaft;

a first idler gear rotatably movable about the driven transmission shaft of main axis X and a second idler gear rotatably movable about the driven transmission shaft, each of the two idler gears comprising an engaging spline;

an engagement sleeve axially movable along the main axis X, the engagement sleeve being rotated by an internal spline engaged with an external spline of the driven transmission shaft, the internal spline of the engagement sleeve being capable of driving the engaging spline of one or other of the idler gears;

an actuation fork axially movable along a control rod of secondary axis X1 parallel to the main axis X and arranged to move the engagement sleeve;

an actuation device having all or some of the aforementioned features, wherein the receiving part is a control member rigidly connected to the actuation fork and that slides along the secondary axis X1 of the control rod, so that when the receiving part is in a first coupled end position, torque is transmitted between the first idler gear and the driven transmission shaft, and when the receiving part is in a second coupled end position, torque is transmitted between the second idler gear and the driven transmission shaft.

Advantageously, the engagement sleeve can be in an intermediate uncoupled position when the angular position of the output shaft is situated in the middle of the second angular sector.

This transmission system architecture is compact and suitable for any incorporation into a speed reducer of a two-speed electric vehicle to connect one or the other of the idler gears to a driven shaft. When the reversible electric machine associated with the speed reducer is inactive, there is no benefit in engaging one or other of the speed ratios of the speed reducer. In this embodiment of the invention, the transmission system is an improved two-speed jaw clutch.

Preferably, the control member can have a U-shaped receiving recess comprising two actuating arms supporting the parallel surfaces separated by a distance along the main axis X.

Advantageously, the actuation fork can directly incorporate the control member, a central hub and arms, the central hub sliding on the control rod.

Preferably, the control rod can be fixed relative to the fastening housing.

The invention further relates to a gearbox, comprising a transmission system having at least one speed ratio as set out above, the actuation device driving the sliding of the receiving part along the secondary axis X1 of the control rod.

The invention further relates to a hybrid or electric motor vehicle comprising a transmission system as set out above.

BRIEF DESCRIPTION OF THE SEVERAL VIEWS OF THE DRAWINGS

Further features, details and advantages of the invention will become more clearly apparent from reading the following description, and from studying exemplary embodiments given by way of non-limiting illustration, with reference to the appended drawings, in which.

DETAILED DESCRIPTION OF THE INVENTION

Figure 1:
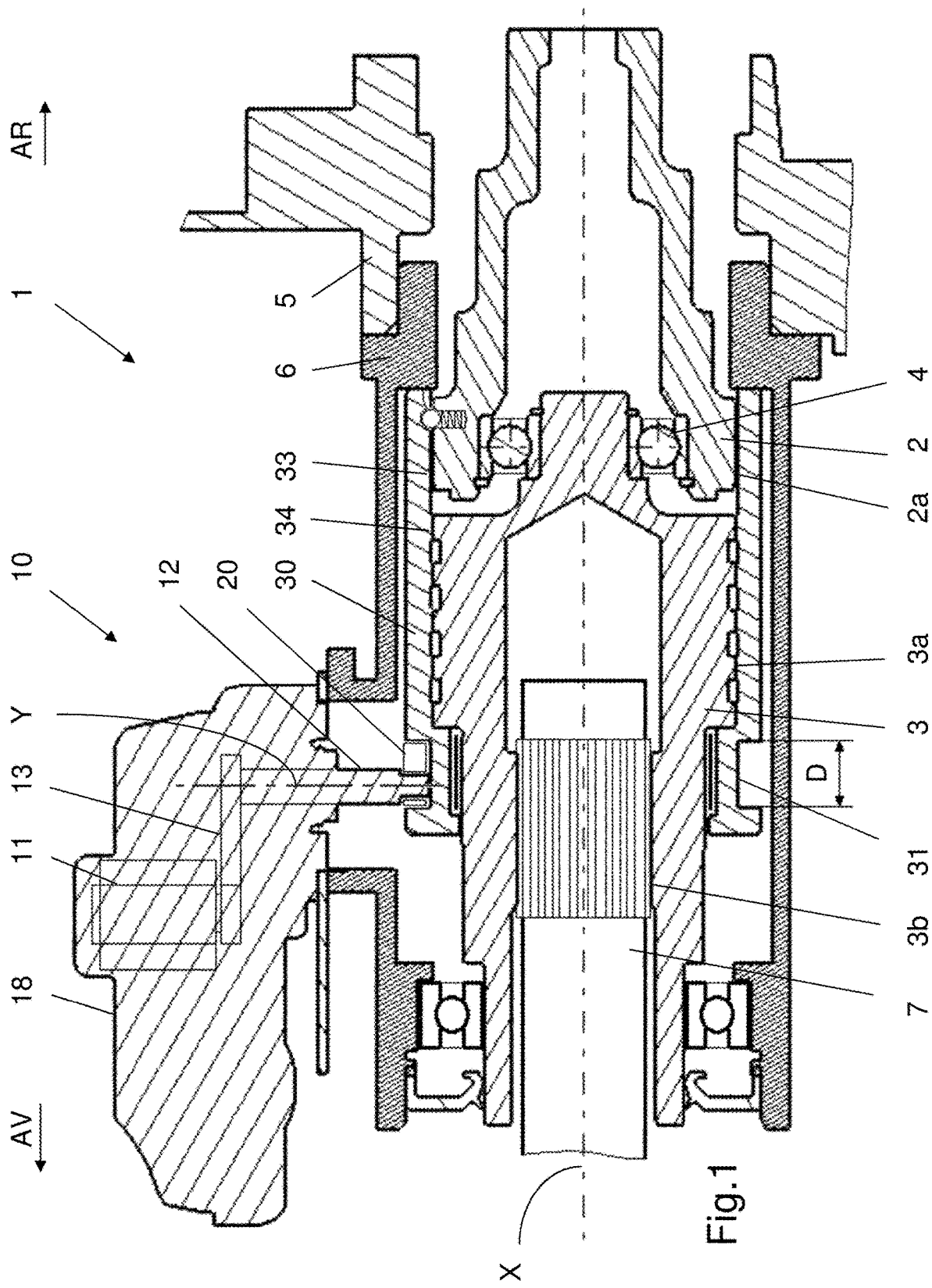
FIG. 1 is a cross-sectional view of a transmission system provided with its actuation device according to a first embodiment of the invention.

The features, variants and different embodiments of the invention can be combined with one another, in various combinations, provided that they are not mutually incompatible or mutually exclusive.

In the figures, elements common to several figures have the same reference sign.

In the description and the claims, the terms "external" and "internal" and the orientations "axial" and "radial" will be used to denote elements of the transmission system according to the definitions given in the description. By convention, the "radial" orientation is orthogonal to the main axis of rotation X of the transmission system determining the "axial" orientation and, from the inside to the outside moving away from said axis, the "circumferential" orientation is orthogonal to the main axis X and orthogonal to the radial direction.

FIGS. 1 to 5 illustrate a transmission system 1 according to a first embodiment of the invention. Here, the transmission system 1 is a connecting clutch between two shafts 2, 3 that is used, in a drive train of a vehicle, to transmit torque originating from an internal combustion engine or an electric motor, not illustrated, to a wheel shaft 7 of a motor vehicle. Such a transmission system can for example form part of a secondary drive train capable of transmitting torque from a secondary motor of the vehicle, such as an electric motor, to a rear or front axle of a vehicle, while a primary drive chain is capable of transmitting torque from a main engine, for example an internal combustion engine, to the wheel shafts of another axle of the vehicle. When the reversible electric machine associated with the speed reducer is inactive, there is no benefit in leaving said machine connected to the wheel of the vehicle. The connecting clutch is then disengaged.

The transmission system 1 is kinematically interposed between a speed reducer 5 and the wheel shaft 7 of the vehicle. The output shaft of the speed reducer is referred to as the drive shaft 2. The drive transmission shaft 2 of the transmission system 1 comprises a first external spline 2a machined on the end thereof.

The transmission system 1 also comprises a driven transmission shaft 3 coaxial with the drive shaft 2, comprising a second external spline 3a. In this example, the driven shaft 3 is inserted into the drive shaft 2 and rotatably guided by means of a guide bearing 4. The driven transmission shaft 3 comprises a torque output internal spline 3b rotatably connected to the wheel shaft 7 of the vehicle.

In order to actuate the transmission system 1, an electrically-powered actuation device 10 is used. The actuation device 10 comprises in particular:
- an electric motor 11 kinematically connected to a speed reduction device 13 and an output shaft 12 of the speed reduction device of axis of rotation Y;
- an actuation cam 20 rigidly connected to the output shaft 12 for rotation therewith;
- a receiving part 30 axially movable along a main axis X perpendicular to the axis of rotation Y, comprising a recess 31 for receiving the actuation cam formed by two surfaces 32 parallel to each other and perpendicular to the main axis X.

In this actuation device, the receiving part 30 moves axially between two end positions when the output shaft pivots about its axis of rotation Y.

More specifically, the receiving part 30 is an axial sliding sleeve having a shape exhibiting symmetry of revolution, the axial sliding sleeve 30 comprising at least a first internal connecting spline 33 arranged to rotate the drive shaft 2 and a second internal connecting spline 34 arranged to rotate the driven shaft 3. The first and second internal splines 33, 34 are engaged respectively in the first external spline 2a of the drive shaft and the second external spline 3a of the driven shaft when the receiving part 30 is in one of the two end positions of the receiving part 30, this end position being referred to as the second coupled end position.

The second internal connecting spline 34 is disengaged from the second external spline 3a of the driven shaft 3 when the receiving part 30 is in a first uncoupled end position. The axial sliding sleeve 30 moves axially by a value Dx relative to the driven transmission shaft 3, which is axially fixed.

In order to transmit more torque in a small axial footprint, the second internal connecting spline 34 of the axial sliding sleeve is made in the form of a series of internal splines axially spaced apart at a uniform pitch, for example five internal splines axially spaced apart at a pitch of between 3 and 15 mm. The second external spline 3a of the driven shaft 3 is also made in the form of a series of internal splines axially spaced apart at the same uniform pitch.

Figure 3:
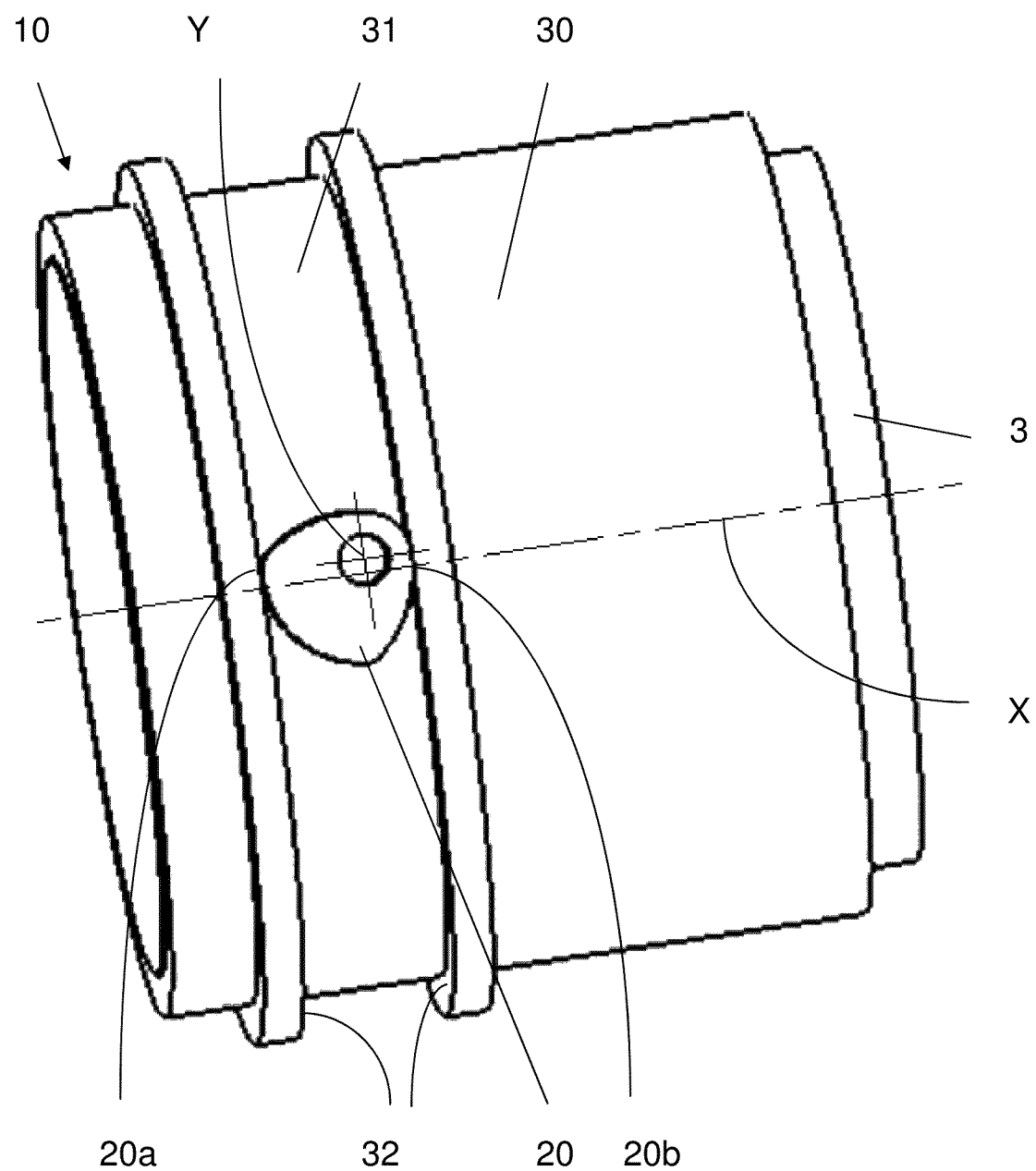
FIG. 3 is a simplified view of the actuation device in FIG. 1 in a first end position.
Figure 4:
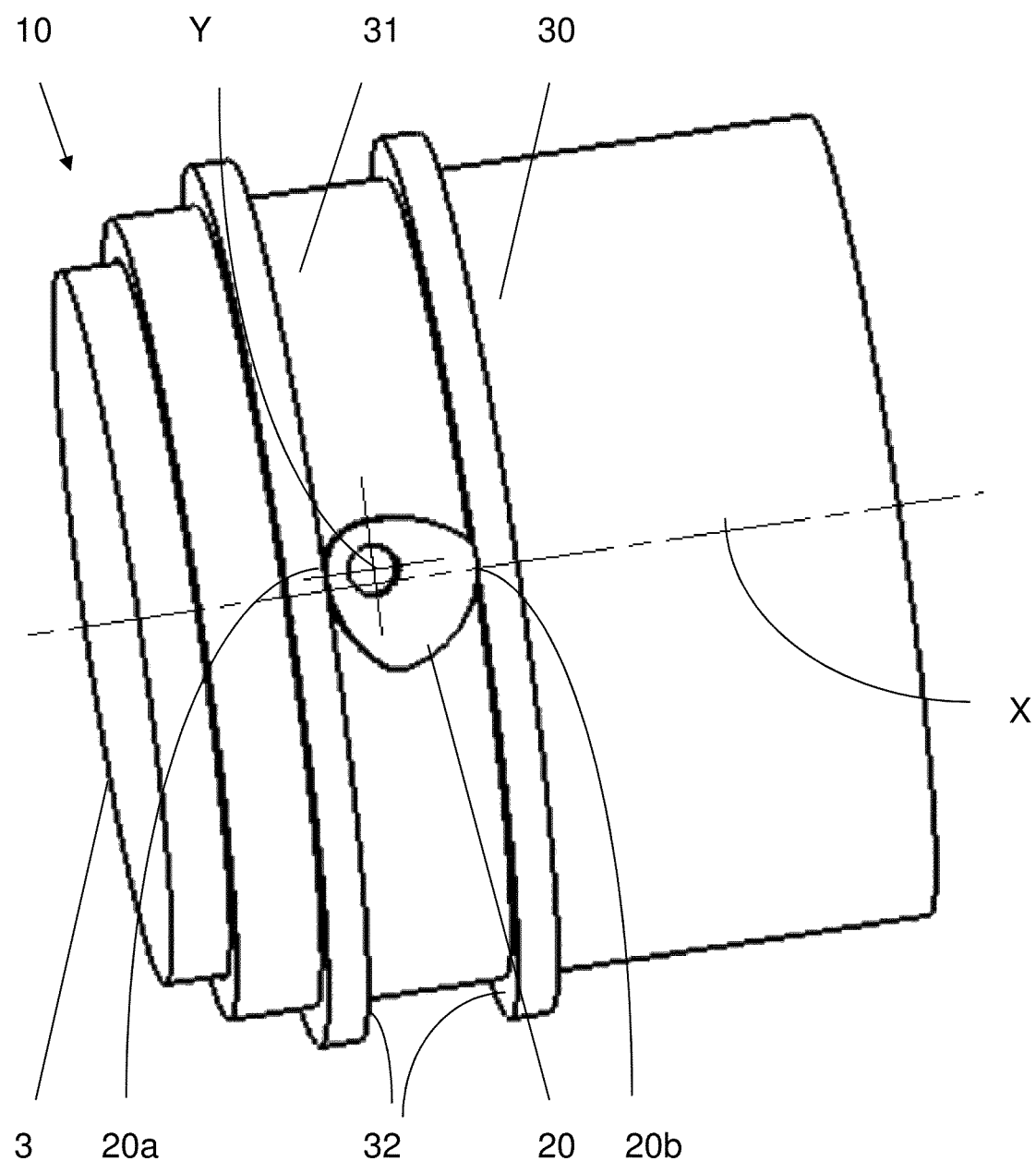
FIG. 4 is a simplified view of the actuation device in FIG. 1 in a second end position.

As illustrated in FIGS. 3 and 4, the actuation cam 20 is fastened to the end of the output shaft 12, for example force-fitted. In particular, the actuation cam 20 comprises a connecting orifice 24, the output shaft 12 being inserted into this connecting orifice.

The rotation of the actuation cam 20 about the axis of rotation Y moves the receiving part 30. In this first embodiment, the receiving part 30 is a part exhibiting symmetry of revolution about the main axis X. The receiving part 30 is rotated by the drive shaft 2 by means of the internal spline 33 that meshes with the first external spline 2a. As the receiving recess 31 is made in the form of an annular groove, the relative rotation about the main axis X between the receiving part 30 and the actuation cam 20 is possible. In this example, the actuation cam 20 is received directly in the receiving part 30. As a variant, the actuation cam can be received in an intermediate component kinematically connected to the receiving part.

The actuation cam 20 has two contact zones 20a, 20b bearing on the parallel surfaces 32 of the receiving recess, and the bearing width L along the main axis X separating the two contact zones is constant over the entire rotation of the output shaft. To guarantee that the actuation cam 20 is displaced in the annular groove without undesirable friction, an operating clearance is defined between the bearing width L of the actuation cam and the distance D axially separating the two parallel surfaces 32 of the receiving recess along the main axis X.

Figure 2:
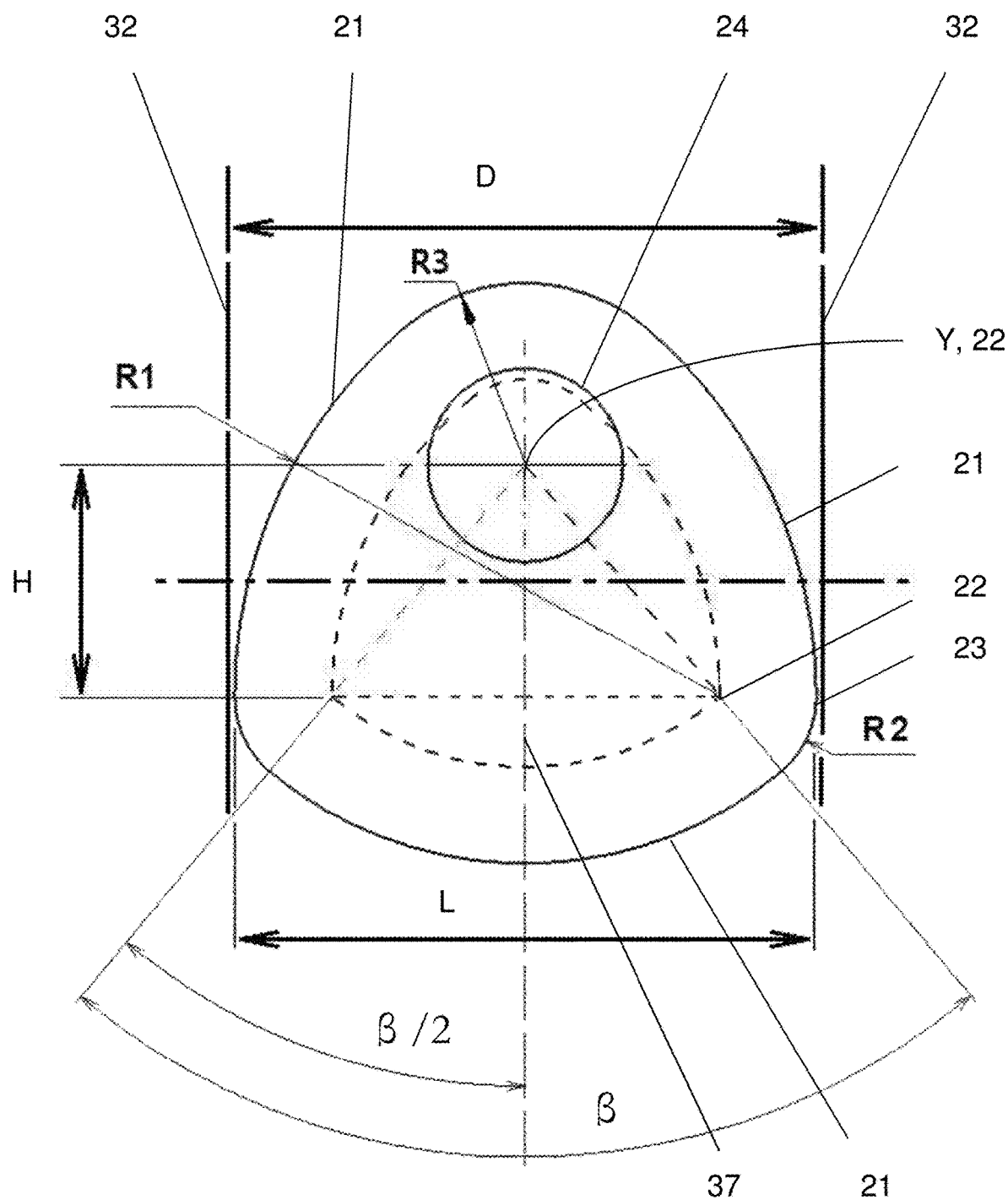
FIG. 2 is a top view of the actuation cam of the actuation device in FIG. 1.

As illustrated in FIG. 2, the actuation cam 20 comprises three actuation faces 21 made in the form of a cylinder portion, the three centres 22 of the cylinder portions forming an isosceles triangle, the main vertex of the isosceles triangle being coincident with the axis of rotation Y of the output shaft. The geometry of the contact zones 20a, 20b of the actuation cam uses large-diameter cylinder portions making it possible to reduce the contact pressure with the parallel surfaces of the receiving recess. During the rotation of the actuation cam, the actuation face 21 slides on one of the parallel surfaces 32.

In this first embodiment, the actuation cam 20 has a symmetrical actuation profile the axis of symmetry of which passes through the bisector 37 of the isosceles triangle, the bisector of the isosceles triangle corresponding to the middle of the second angular sector $\alpha 2$. The isosceles triangle has a main angle $\beta$ of between 45° and 150° for example. The actuation cam 20 thus has a symmetrical profile passing through the axis of rotation Y.

Due to the specific geometry of the profile of the actuation cam, the operating clearance between the bearing width L of the actuation cam and the distance D is constant over the entire rotation of the output shaft. The operating clearance is of the order of 0.1 mm to 0.6 mm. The accuracy of the actuation is thus improved.

To guarantee that the actuation cam 20 is displaced in the annular groove 31 without undesirable friction, the actuation faces 21 of the actuation cam 20 are connected together by a cylindrical connecting face 23 having a smaller radius R2 than the radius R1 of the cylinder portions, the connecting radius being between 1 and 5 mm. During the rotation of the actuation cam, the cylindrical connecting face 23 also slides on one of the parallel surfaces 32. The contact zones 20a, 20b of the actuation cam are alternatively formed by an actuation face 21 and/or a cylindrical connecting face 23. The geometry of the contact zone 20a, 20b then has a radius R1 or a radius R2.

The actuation cam 20 also comprises an end radius R3 arranged to interact with the parallel surfaces 32 of the receiving part 30 and tangentially connecting two actuation faces 21, the centre of this end radius R3 being concentric with the axis of rotation Y. The centre of the end radius R3 passes through the bisector 37 of the isosceles triangle. The dimension of the radius R3 is defined so that it complies with the bearing width L. The sum of the radius R1 of the cylinder portion forming the actuation face 21 associated with the main vertex of the isosceles triangle and the radius R3 is thus equal to the bearing width L.

For example, the end radius R3 is larger than the radius R2 of the cylindrical connecting faces.

In order to recenter the actuation cam 20 in the receiving recess 31, the main axis X of the receiving part 30 does not intersect the axis of rotation Y. For example, the axis of rotation Y is offset relative to a plane parallel to the axis of rotation Y and passing through the main axis X by a value of a few millimetres.

This actuation device 10 also comprises a protective housing 18 that protects the electric motor 11 and supports the speed reduction device 13. The protective housing 18 is attached to a protective duct 6 of the transmission system 1. The protective duct 6 is in the shape of a cylinder the axis of which is coincident with the main axis X and comprises a through-orifice for the output shaft 12 of the actuation device. The axis of the through-orifice is perpendicular to the main axis X. The protective duct 6 is attached to the casing of the speed reducer 5.

The operation of the actuation device making it possible to switch from the first uncoupled end position to the second coupled end position in a short actuation time will now be described.

Figure 5:
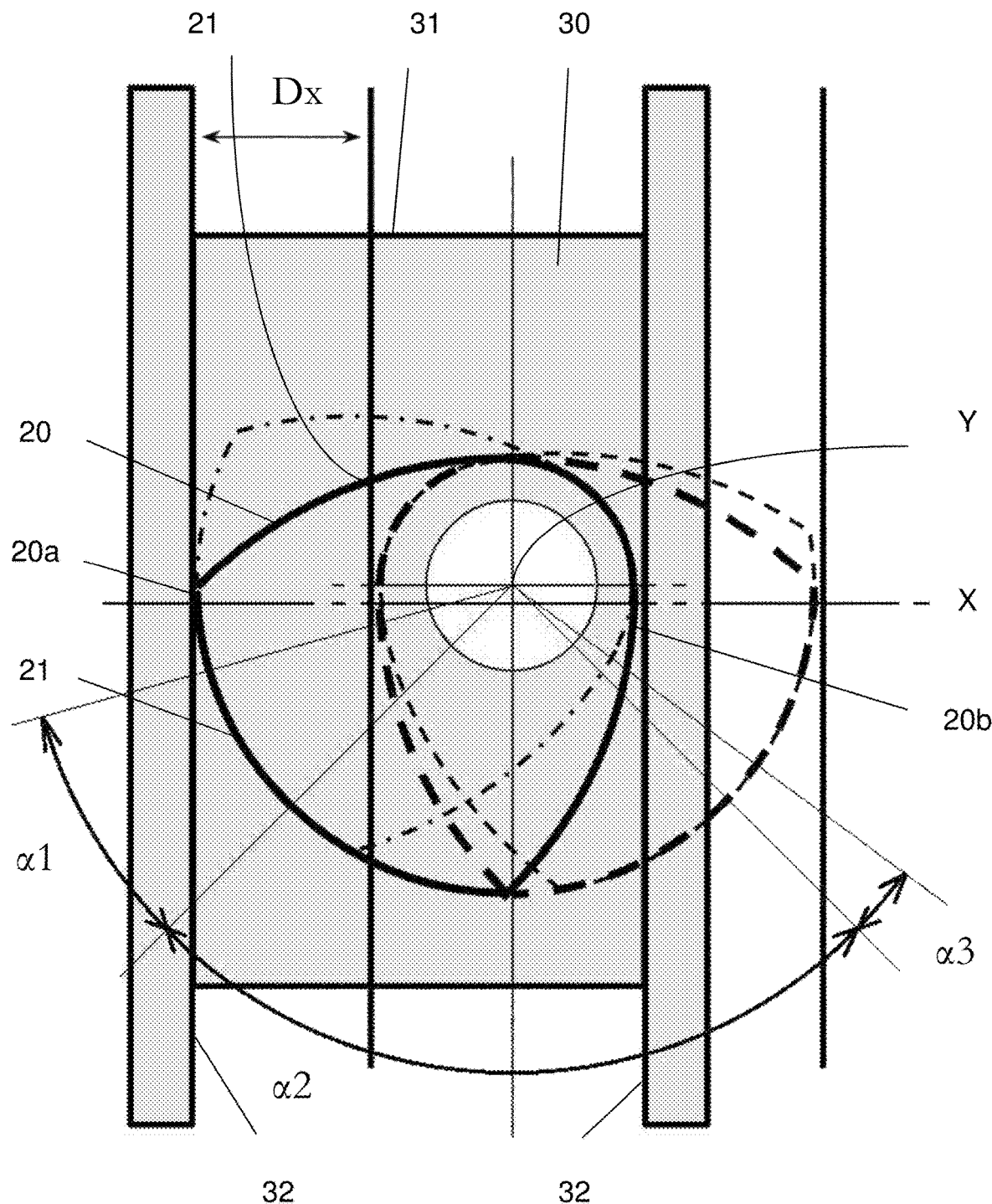
FIG. 5 is another simplified view of the actuation device in FIG. 1.

As illustrated in FIGS. 3 to 5, the output shaft 12 is arranged to pivot through three adjacent angular sectors α1, α2, α3, a first angular sector α1, a second angular sector α2 adjacent to the first angular sector α1, and a third angular sector α3 adjacent to the second angular sector α2.

Initially, the receiving part 30 is in the first uncoupled end position. The receiving part 30 remains axially immobile in the first end position when the rotation of the output shaft is situated in the first angular sector. The angle value of the first angular sector α1 is 15°. In this first angular sector α1, the receiving part 30 remains in a stable position that makes it possible to switch off the power supply in the actuation device, thus reducing the electricity consumption of the vehicle.

Next, the receiving part 30 moves axially between the two uncoupled and coupled end positions when the output shaft 12 pivots through the whole second angular sector α2. The movement Dx of the receiving part 30 can be seen in FIG. 5. The angle value of the second angular sector α2 is approximately 100°. This small angle value of less than 180° makes it possible to reduce the actuation time. FIG. 3 illustrates the position of the actuation cam 20 in the first uncoupled end position. The axial sliding sleeve 30 is axially positioned due to the actuation faces 21 of the actuation cam 20, which are flush with the parallel surfaces 32 of the receiving recess 31. FIG. 4 illustrates the position of the actuation cam 20 in the second coupled end position.

Finally, the receiving part 30 remains axially immobile in the second end position when the rotation of the output shaft is situated in the third angular sector α3. The angle value of the third angular sector α3 is approximately 5°. In this third angular sector α3, the receiving part 30 remains in a stable position that makes it possible to switch off the power supply in the actuation device, thus reducing the electricity consumption of the vehicle.

Due to the specific geometry of the profile of the actuation cam, the bearing width L along the main axis X separating the two contact zones 20a, 20b is constant in the three angular sectors α1, α2, α3 of rotation of the output shaft. FIG. 5 illustrates the different angular positions adopted by the actuation cam 20 during the movement Dx of the receiving part 30.

A second embodiment of the invention, which differs from the preceding embodiment by means of a transmission system architecture comprising an actuation fork 70, will now be described with reference to FIG. 6.

Figure 6:
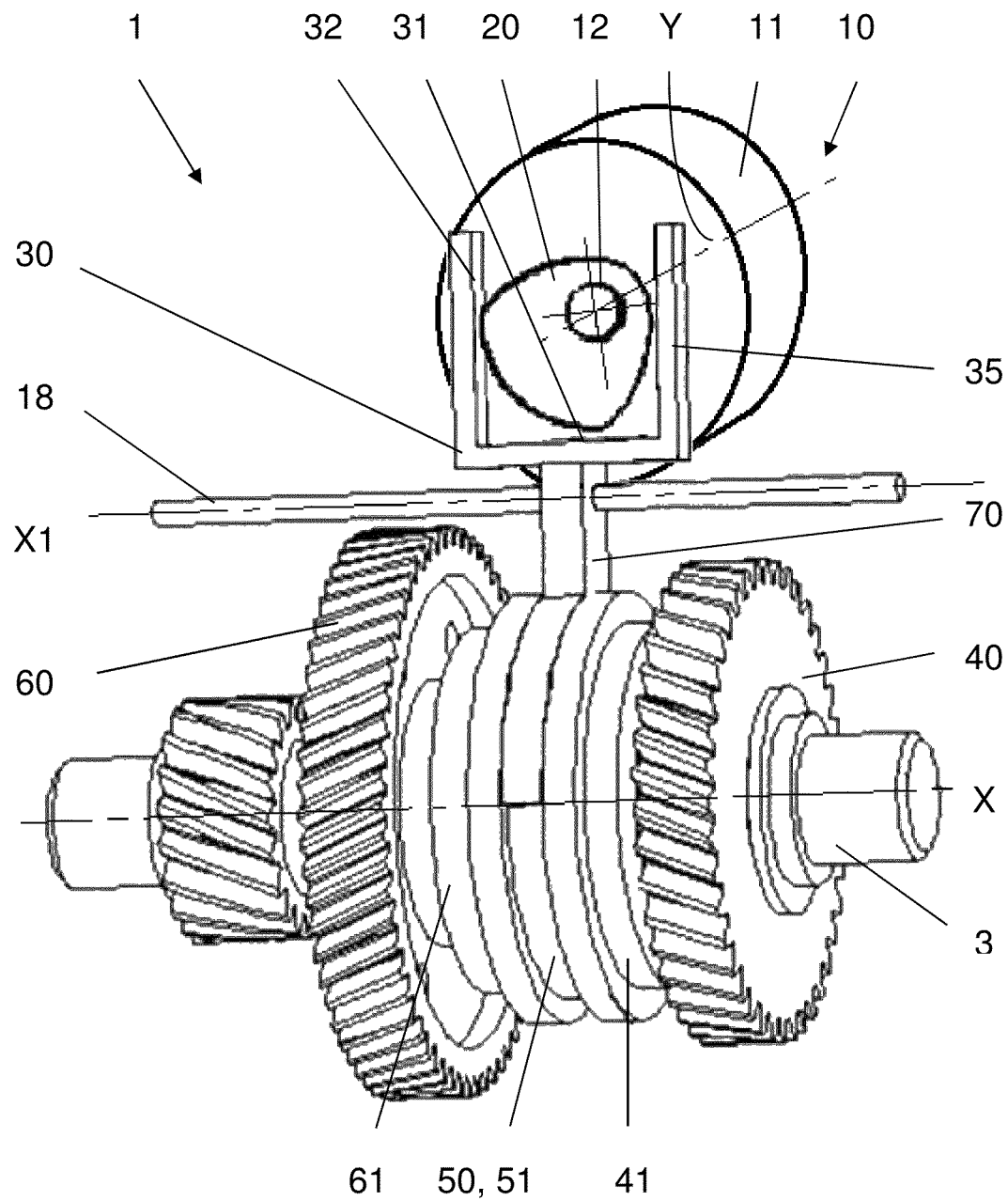
FIG. 6 is a perspective view of a transmission system provided with its actuation device according to a second embodiment of the invention.

FIG. 6 is a perspective view of a transmission system 1 corresponding to part of a speed reducer. The speed reducer can for example be intended to be provided on an electric motor vehicle for which the change in speed ratio takes place automatically. The selection of the speed ratio between a first ratio and a second ratio is carried out by an actuation device 10 according to the invention.

The actuation device 10 is configured to select a speed ratio by means of the actuation fork 70. To this end, the actuation fork 70 makes it possible to slide an engagement sleeve 50 along the main axis X so as to rigidly connect a driven transmission shaft 3 to a first or second idler gear 40, 60. Such interaction between the engagement sleeve 50 and one or other of the first and second idler gears 40, 60 takes place when the angles of the teeth of these two elements coincide.

To this end, the idler gear 40 of the first ratio and the idler gear 60 of the second ratio each comprise an engagement spline 41, 61 arranged about the main axis X capable of interacting with the engagement sleeve 50. The idler gear 40 of the first ratio and the idler gear 60 of the second ratio are rotatably mounted about the driven transmission shaft 3 and the engagement sleeve 50 is rigidly mounted on the driven shaft 3 for rotation therewith, for example by means of an internal spline 51. The interaction between the internal spline 51 of the engagement sleeve 50 and the engagement spline 41 of the idler gear 40 of the first ratio, or the engagement spline 61 of the idler gear 60 of the second ratio respectively, therefore makes it possible to rigidly connect for conjoint rotation about the main axis X the idler gear 40 of the first ratio or the idler gear 60 of the second ratio respectively, and the driven shaft 3. The engagement sleeve 50 comprises for example engaging teeth at its two axial ends in the continuation of the internal spline 51.

Preferably, the engagement sleeve 50 can be kept spaced apart from the first idler gear 40 of the first ratio and the second idler gear 60 of the second ratio in a neutral position, in which no torque is transmitted between the input shaft of the speed reducer and the driven transmission shaft 3 as neither of the idler gears 40 and 60 interacts with the engagement sleeve 50. The neutral position corresponds to a disconnected mode in which the electric machine no longer transmits torque to the wheels of the vehicle.

Here, the engagement sleeve 50 is positioned between the first idler gear 40 and the second idler gear 60, arms of the actuation fork 70 also being positioned between these two idler gears 40, 60. A ratio of the speed reducer corresponds to each first gear 40 and second gear 60, for example with a first speed ratio for the first gear 40 and a second speed ratio for the second gear 60. In order to select one or other of these speed ratios, the actuation fork 70 can move laterally so as to engage the engagement sleeve 50 with either the first idler gear 40 or the second idler gear 60.

As illustrated in FIG. 6, the actuation fork 70 has arms that are inserted into an annular groove of the engagement sleeve 50. The actuation fork 70 slides axially along a control rod 18. This control rod 18 extends along a secondary axis X1 and corresponds for example to a solid cylinder.

In order to actuate the transmission system 1, an electrically-powered actuation device 10 is used. The actuation device 10 comprises in particular:

an electric motor 11 kinematically connected to a speed reduction device and an output shaft 12 of the speed reduction device of axis of rotation Y;
 an actuation cam 20 rigidly connected to the output shaft for rotation therewith;
 a receiving part 30 axially movable along a main axis X perpendicular to the axis of rotation Y, comprising a recess 31 for receiving the actuation cam formed by two surfaces 32 parallel to each other and perpendicular to the main axis X.

In this actuation device, the receiving part 30 moves axially between two end positions when the output shaft pivots about its axis of rotation Y.

More specifically, the receiving part 30 is a control member rigidly connected to the actuation fork 70 and that slides along the secondary axis X1 of the control rod 18, so that when the receiving part 30 is in a first coupled end position, torque is transmitted between the first idler gear 40 and the driven transmission shaft 3, and when the receiving part 30 is in a second coupled end position, torque is transmitted between the second idler gear 60 and the driven transmission shaft 3.

The engagement sleeve 50 is in an intermediate uncoupled position, otherwise referred to as the neutral position, when the angular position of the output shaft 12 is situated in the middle of the second angular sector α2.

In this second embodiment, the control member 30 has a U-shaped receiving recess 31 comprising two actuating arms 35 supporting the parallel surfaces 32 separated by a distance D along the main axis X.

The operation of this actuation device according to the second embodiment, making it possible to switch from the first coupled end position to the second coupled end position in a short actuation time, will now be described.

As illustrated in FIG. 6, the output shaft 12 is arranged to pivot through three adjacent angular sectors α1, α2, α3, a first angular sector α1, a second angular sector α2 adjacent to the first angular sector α1, and a third angular sector α3 adjacent to the second angular sector α2.

Initially, the control member 30 is in a first coupled end position in which the first speed ratio is engaged. The actuation fork 70 remains axially immobile in the first end position when the rotation of the output shaft is situated in the first angular sector. The angle value of the first angular sector α1 is 5°. In this first angular sector α1, the control member 30 remains in a stable position that makes it possible to switch off the power supply in the actuation device, thus reducing the electricity consumption of the vehicle.

Next, the control member 30 moves axially between the two coupled end positions when the output shaft 12 pivots through the whole second angular sector α2. The angle value of the second angular sector α2 is approximately 120°. This small angle value of less than 180° makes it possible to reduce the actuation time.

Finally, the control member 30 is in a second coupled end position in which the second speed ratio is engaged. The actuation fork 70 remains axially immobile in the second coupled end position when the rotation of the output shaft is situated in the third angular sector α3. The angle value of the third angular sector α3 is identical to the angle value of the first angular sector α1.

In this third angular sector α3, the control member 30 also remains in a stable position.

To guarantee that the actuation cam 20 is displaced in the U-shaped recess 31 for receiving the control member 30 without undesirable friction, an operating clearance is defined between the bearing width L of the actuation cam and the distance D axially separating the two parallel surfaces 32 of the receiving recess along the main axis X. Due to the specific geometry of the profile of the actuation cam 20, the bearing width L along the main axis X separating the two contact zones 20a, 20b is constant in the three angular sectors α1, α2, α3 of rotation of the output shaft.

Another advantage of the invention is the improved reliability of the electric motor. The output shaft 12 is rotated at low torque given that in the first angular sector α1 or the third angular sector α3, the contact zone 20a, 20b of the actuation cam 20 is tangent to the surface 32 of the receiving recess. There is therefore no resisting torque, which allows the rotation of the electric machine at low torque.

The present invention is not however limited to the means and configurations described and illustrated herein, and it also extends to all equivalent means and configurations and to any technically effective combination of such means.

The invention claimed is:

1. An actuation device for a transmission system, comprising:
    an electric motor kinematically connected to a speed reduction device and an output shaft of the speed reduction device having an axis of rotation, the output shaft being arranged to pivot through three adjacent angular sectors being a first angular sector, a second angular sector adjacent to the first angular sector, and a third angular sector adjacent to the second angular sector;
    an actuation cam rigidly connected to the output shaft for rotation therewith; and
    a receiving part axially movable along a main axis perpendicular to the axis of rotation, comprising a receiving recess for receiving the actuation cam formed by two surfaces parallel to each other and perpendicular to the main axis,
    wherein the receiving part moves axially between two end positions when the output shaft pivots through the whole second angular sector,
    wherein the receiving part remains axially immobile in a first end position when the rotation of the output shaft is situated in the first angular sector,
    wherein the receiving part remains axially immobile in a second end position when the rotation of the output shaft is situated in the third angular sector,
    wherein the actuation cam has two contact zones bearing on the parallel surfaces of the receiving recess, and a bearing width along the main axis separating the two contact zones is constant in the three angular sectors of rotation of the output shaft, and
    wherein an angle value of the first angular sector is greater than 3° and an angle value of the third angular sector is greater than 3°.

2. The actuation device according to claim 1, wherein an operating clearance is defined between the bearing width of the actuation cam and a distance axially separating the two parallel surfaces of the receiving recess along the main axis, and the operating clearance is constant in the three angular sectors of rotation of the output shaft.

3. The actuation device according to claim 1, wherein the receiving part is a part exhibiting symmetry of revolution about the main axis, the receiving recess being an annular groove.

4. The actuation device according to claim 1, wherein the receiving part comprises at least a first connecting spline arranged to rotate a driven shaft, and a second connecting spline arranged to drive a drive shaft, the first and second connecting splines being respectively engaged with the respective driven shaft and respective drive shaft when the receiving part is in a second coupled end position, and one of the first and second connecting splines being respectively disengaged from the respective driven shaft and respective drive shaft when the receiving part is in a first uncoupled end position.

5. The actuation device according to claim 1, wherein the actuation cam comprises three actuation faces made in a form of a cylinder portion, centers of the cylinder portions forming an isosceles triangle, and a main vertex of the isosceles triangle being coincident with the axis of rotation of the output shaft.

6. The actuation device according to claim 5, wherein at least two actuation faces of the actuation cam are connected together by a cylindrical connecting face having a smaller radius than a radius of the cylinder portions, the cylindrical connecting face radius being between 1 and 5 mm.

7. The actuation device according to claim 6, wherein the actuation cam has a symmetrical actuation profile with an axis of symmetry passing through a bisector of the isosceles triangle, the bisector of the isosceles triangle corresponding to a middle of the second angular sector.

8. The actuation device according to claim 5, wherein the actuation cam has a symmetrical actuation profile with an axis of symmetry passing through a bisector of the isosceles triangle, the bisector of the isosceles triangle corresponding to a middle of the second angular sector.

9. The actuation device according to claim 1, wherein the actuation cam comprises three actuation faces made in a form of a cylinder portion, centers of the cylinder portions forming an equilateral triangle, and one vertex of the equilateral triangle being coincident with the axis of rotation of the output shaft.

10. The actuation device according to claim 1, wherein the actuation cam comprises three actuation faces made in the form of a cylinder portion, centers of the cylinder portions forming an isosceles triangle with a main angle of 90°, and a main vertex of the isosceles triangle being coincident with the axis of rotation of the output shaft.

11. A transmission system comprising:
a drive transmission shaft comprising a first external spline;
a driven transmission shaft coaxial with the drive shaft, comprising a second external spline; and
an actuation device according to claim 1,
wherein the receiving part is an axial sliding sleeve having a shape exhibiting symmetry of revolution, the axial sliding sleeve comprising at least a first internal connecting spline arranged to rotate the drive shaft and a second internal connecting spline arranged to rotate the driven shaft, the first and second internal splines being engaged respectively in the first external spline of the drive shaft and the second external spline of the driven shaft when the receiving part is in one of the two end positions, this end position being referred to as the second coupled end position.

12. The transmission system according to claim 11, wherein the second internal connecting spline is disengaged from the second external spline of the driven shaft when the receiving part is in the other of the two end positions, this end position being referred to as the first uncoupled end position.

13. A transmission system comprising:
a driven transmission shaft;
an idler gear rotatably movable about the driven transmission shaft of main axis, the idler gear comprising an engaging spline;
an engagement sleeve axially movable along the main axis, the engagement sleeve being rotated by an internal spline engaged with an external spline of the driven transmission shaft, the internal spline of the engagement sleeve being capable of driving the engaging spline of the idler gear;
an actuation fork axially movable along a control rod of secondary axis parallel to the main axis and arranged to move the engagement sleeve; and
an actuation device according to claim 1,
wherein the receiving part is a control member rigidly connected to the actuation fork and that slides along the secondary axis of the control rod, so that when the receiving part is in a first uncoupled end position, no torque is transmitted between the idler gear and the driven transmission shaft, and when the receiving part is in a second coupled end position, torque is transmitted between the idler gear and the driven transmission shaft.

14. A transmission system comprising:
a driven transmission shaft;
a first idler gear rotatably movable about the driven transmission shaft of main axis and a second idler gear rotatably movable about the driven transmission shaft, each of the two idler gears comprising an engaging spline;
an engagement sleeve axially movable along the main axis, the engagement sleeve being rotated by an internal spline engaged with an external spline of the driven transmission shaft, the internal spline of the engagement sleeve being capable of driving the engaging spline of one or other of the idler gears;
an actuation fork axially movable along a control rod of secondary axis parallel to the main axis and arranged to move the engagement sleeve; and
an actuation device according to claim 1,
wherein the receiving part is a control member rigidly connected to the actuation fork and that slides along the secondary axis of the control rod, so that when the receiving part is in a first coupled end position, torque is transmitted between the first idler gear and the driven transmission shaft, and when the receiving part is in a second coupled end position, torque is transmitted between the second idler gear and the driven transmission shaft.

15. The transmission system according to claim 14, wherein the engagement sleeve is in an intermediate uncoupled position when an angular position of the output shaft is situated in a middle of the second angular sector.

16. An actuation device for a transmission system, comprising:
an electric motor kinematically connected to a speed reduction device and an output shaft of the speed reduction device having an axis of rotation, the output shaft being arranged to pivot through three adjacent angular sectors being a first angular sector, a second angular sector adjacent to the first angular sector, and a third angular sector adjacent to the second angular sector;
an actuation cam rigidly connected to the output shaft for rotation therewith; and
a receiving part axially movable along a main axis perpendicular to the axis of rotation, comprising a receiving recess for receiving the actuation cam formed by two surfaces parallel to each other and perpendicular to the main axis,
wherein the receiving part moves axially between two end positions when the output shaft pivots through the whole second angular sector,
wherein the receiving part remains axially immobile in a first end position when the rotation of the output shaft is situated in the first angular sector,
wherein the receiving part remains axially immobile in a second end position when the rotation of the output shaft is situated in the third angular sector, wherein the receiving part is a part exhibiting symmetry of revolution about the main axis, the receiving recess being an annular groove, and wherein an angle value of the first angular sector is greater than 3° and an angle value of the third angular sector is greater than 3°.

17. An actuation device for a transmission system, comprising:

an electric motor kinematically connected to a speed reduction device and an output shaft of the speed reduction device having an axis of rotation, the output shaft being arranged to pivot through three adjacent angular sectors being a first angular sector, a second angular sector adjacent to the first angular sector, and a third angular sector adjacent to the second angular sector;

an actuation cam rigidly connected to the output shaft for rotation therewith; and a receiving part axially movable along a main axis perpendicular to the axis of rotation, comprising a receiving recess for receiving the actuation cam formed by two surfaces parallel to each other and perpendicular to the main axis, wherein the receiving part moves axially between two end positions when the output shaft pivots through the whole second angular sector, wherein the receiving part remains axially immobile in a first end position when the rotation of the output shaft is situated in the first angular sector, wherein the receiving part remains axially immobile in a second end position when the rotation of the output shaft is situated in the third angular sector, and wherein the receiving part comprises at least a first connecting spline arranged to rotate a driven shaft, and a second connecting spline arranged to drive a drive shaft, the first and second connecting splines being respectively engaged with the respective driven shaft and respective drive shaft when the receiving part is in a second coupled end position, and one of the first and second connecting splines being respectively disengaged from the respective driven shaft and respective drive shaft when the receiving part is in a first uncoupled end position.

* * * * *